F. W. TOAN.
UNIVERSAL JOINT.
APPLICATION FILED SEPT. 29, 1920.
1,407,361.
Patented Feb. 21, 1922.
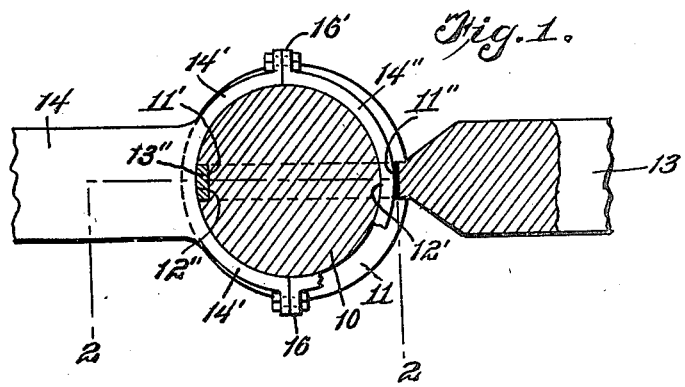
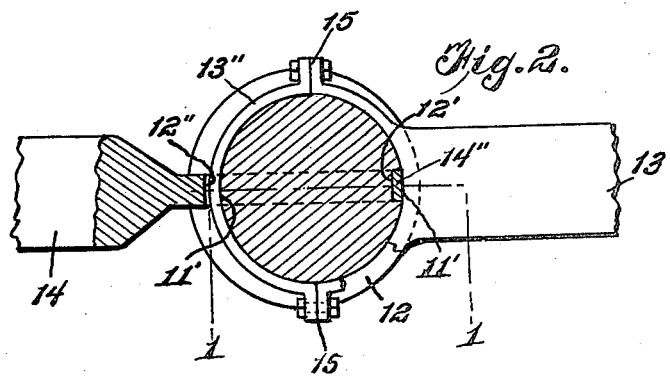
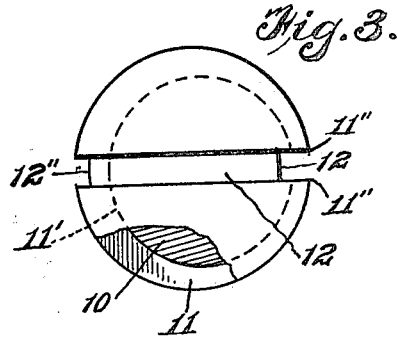
Inventor:
Fred W. Toan,
By
Attorney.

UNITED STATES PATENT OFFICE.

FRED W. TOAN, OF BOWLING GREEN, OHIO.

UNIVERSAL JOINT.

1,407,361.

Specification of Letters Patent. Patented Feb. 21, 1922.

Application filed September 29, 1920. Serial No. 413,467.

*To all whom it may concern:*

Be it known that I, FRED W. TOAN, a citizen of the United States, residing at Bowling Green, in the county of Wood and State of Ohio, have invented new and useful Improvements in Universal Joints, of which the following is a specification.

The invention relates to improvements in universal joints, and more particularly to a type thereof involving the use of a ball form of intermediary connecting the opposed yoked ends of the shaft sections to be coupled.

Among other objects of the invention, the same provides for a very strong, compact and durable joint of the universal type; one that has maximum strength and durability compared to the actual weight of the metal used in the same and to the low cost of manufacture; one that is extremely simple in construction as to involve ease and rapidity in assembly or dismounting of the parts; one that is capable of being easily inspected for wear and tear on the parts thereof for adjustment of the latter, and for lubricating the same when necessary; and, in the particular embodiments thereof, one wherein the spreading of the connected yokes under the usual strains and stresses is absolutely prevented.

With the foregoing and other objects in view, the invention resides in the certain new and useful construction, arrangement and assembly of parts as will be hereinafter more fully described, set forth in the appended claim, and illustrated in the accompanying drawings, in which:

Figure 1 is a fragmentary section of one, or the simplest form of the invention, Figure 2 is a view similar to that of Figure 1 and taken on the line 2—2 thereof, and Figure 3 is a view, partly in section, of the ball intermediary as in Figures 1 and 2.

In the drawings, there is shown a form of the invention which provides for a simple, cheap, powerful joint construction wherein only a relatively small degree of angle is desired, which degree of movement, however, is found sufficient for general purposes.

Referring to the drawings, the numeral 10 indicates a spherical body or ball having a groove 11 and a second groove 12 at right angles to the groove 11. The grooves 11 and 12 are formed eccentric to the center or axis of the ball so that the point of greatest depth of the groove 11, as at 11', is at its point of intersection with the groove 12 at the point of the least depth of the latter, and similarly, the point of greatest depth of the groove 12. as at 12', is at its point of intersection with the point of least depth of the groove 11, or, in other words, the points of greatest depth 11' and 12' are at diametrically opposite points on the ball, and correspondingly, the points of least depth, as at 11" and 12" are so positioned. The ball, thus formed, is to be used as an intermediary between adjacent shaft sections 13 and 14, the end of the section 13 being formed or otherwise provided with a yoke portion 13' to which is secured a separable yoke portion 13", the adjacent ends of the yoke portions 13' and 13" being each provided with outwardly extending ears whereby the same may be secured together by means of the bolts, or other suitable fastenings 15, and similarly, the end of the shaft section 14 is formed, or otherwise provided with a yoke portion 14' to which is secured a separable yoke portion 14", the adjacent ends of the yoke portions 14' and 14" being each provided with outwardly extending ears whereby the same may be secured together by means of the bolts, or other similar fastenings 16, each of the yokes, thus formed, having a true circular formation, the yoke of the shaft section 13 being engaged in the groove 11 and that of the shaft section 14 engaged in the groove 12, as shown in Figures 1 and 2. It is to be noted of this particular construction that, due to the arrangement of the centers of the circles described by the grooves 11 and 12 being "off center" or eccentric with respect to the center or axis of the ball, a powerful joint is provided.

In the matter of lubrication of this universal joint, the same can be readily accomplished in any known or suitable manner.

The salient features of the invention in the broadest conception of the same, resides in the principle of having the ball intermediary surrounded by tight fitting yokes or bearings, each of which are perfect circles, or whose yoke sections are arcs of perfect circles to the point of where they are connected together.

Having thus fully described the invention, what is claimed, is:

A universal joint comprising, in combination, a spherical body having annular grooves therein one at right angles to the other, said grooves being eccentrically disposed upon the said body, the shallowest and the deepest portions of said grooves intersecting each other at diametrically opposite points on said body, shaft sections, yoke members removably carried by said sections and engaged and snugly fitting in said grooves, said yoke members entirely surrounding and filling their respective grooves, the thickness of said yoke sections being substantially equal to the depth of the shallowest parts of said grooves.

In testimony whereof I affix my signature.

FRED W. TOAN.